United States Patent

Shanklin et al.

[11] Patent Number: 5,131,213
[45] Date of Patent: Jul. 21, 1992

[54] SEALING JAWS

[75] Inventors: Frank G. Shanklin, Groton, Mass.; Robin G. Thurgood, Hampstead; Francis X. King, Jr., Nashua, both of N.H.

[73] Assignee: Shanklin Corporation, Ayer, Mass.

[21] Appl. No.: 665,485

[22] Filed: Mar. 6, 1991

[51] Int. Cl.⁵ ............................................. B65B 51/10
[52] U.S. Cl. ..................................... 53/477; 53/373.7; 53/374.8; 156/515
[58] Field of Search ................. 53/370.7, 370.8, 371.8, 53/373.7, 374.8, 477; 156/251, 308.4, 515, 516

[56] References Cited

U.S. PATENT DOCUMENTS

| | | | |
|---|---|---|---|
| 2,852,898 | 9/1958 | Berg | 53/374.8 X |
| 3,195,285 | 7/1965 | Toss | |
| 3,508,378 | 4/1970 | Fehr et al. | 53/374.8 X |
| 3,845,606 | 11/1974 | Wilson | 53/477 X |
| 3,940,305 | 2/1976 | Stenberg | 156/583 |
| 3,982,991 | 9/1976 | Hamm et al. | 53/374.8 X |
| 4,109,792 | 8/1978 | Greenawalt et al. | 53/477 X |
| 4,512,138 | 4/1985 | Greenawalt | 53/374.8 X |
| 4,546,596 | 10/1985 | Cherney | 53/374.8 X |
| 4,662,978 | 5/1987 | Oki | 53/477 X |
| 4,682,976 | 7/1987 | Martin et al. | 53/374.8 X |
| 4,768,326 | 9/1988 | Kovacs | 53/374.8 |
| 4,807,426 | 2/1989 | Smith | 53/552 |
| 4,965,985 | 10/1990 | Masubuchi et al. | 53/374.8 X |
| 5,056,295 | 10/1991 | Williams | 53/550 X |

Primary Examiner—Robert L. Spruill
Assistant Examiner—Daniel B. Moon
Attorney, Agent, or Firm—Barlow & Barlow, Ltd.

[57] ABSTRACT

A sealing jaw apparatus for a plastic film wrapping machine has essentially spaced heated sealing jaws with a reciprocal knife located therebetween. The jaws operate against a heated elastomeric bed that has a longitudinal slot to receive the knife during the cutting operation. The arrangement provides a sealing of thermoplastic film and a severing thereof at a considerably lower temperature then the melting point of the film.

7 Claims, 3 Drawing Sheets

SEALING JAWS

BACKGROUND OF THE INVENTION

This invention pertains to the sealing of heat sealable thermoplastic package wrapping film and more particularly, to the jaws that perform the sealing operation and wrapping machines which may have a plurality of packages in a tube or envelope of film in which it is necessary to produce simultaneously two seals and a cut therebetween. For example, product is fed into the machines and is wrapped in a tube or shroud of film which is still connected to the supply rolls. As the product, which becomes enshrouded in film progresses through the wrapping machine, at some point transverse seal jaws seal the film at the trailing edge of one package and the leading edge of another and simultaneously produce a cut in the film between the two seals.

There are several types of systems in the prior art to produce the above results, all of which seal and cut the packaging film by forcing heated sealing and cutting elements against an elastomeric cushioned bed with the film to be sealed and cut entrapped therebetween. There are wires or bands or combinations thereof which, with an impulse of heat, make the seal and the cut. The major difficulty with this type of system is that precise control of temperature is extremely difficult. If this system is used on polyethylene, it tends to gum up with molten film. If used with polyvinyl chloride film, the film tends to carbonize and build up on the sealing wires. The gumming or build-up is insulative and it interferes with the sealing process. Any attempt to protect the sealing elements, such as with a covering of Teflon fiberglass cloth, reduces the rate of heat transfer to the film and slows down the machine.

Additionally, there are hot knife sealing systems where a hot knife blade comes down, makes the cut in the film and simultaneously seals the two edges of the film together. The hot knife has also yielded a combination by using sealing bars, one on either side of the knife blade to make a fin-type seal. The main difficulty with this system is that the distance the knife blade protrudes is very critical if the jaw, when closed against the elastomer mating bed, is to produce the proper sealing pressure and the proper cutting pressure simultaneously. Further, when using the temperature required to make a clean cut, some types of polyethylene film soften to a point where the molten film will gum up between the knife and the sealing surfaces requiring frequent maintenance and cleaning. A variation of the above described sealing knife combination has a sharp knife which is fixed and protrudes below the sealing bars and cuts the film by forcing it into a slot in the elastomer bed. It is difficult to obtain good cuts with this system unless the knife is very sharp. This precludes applying a Teflon release coating to the knife, and polyethylene film tends to stick to it rendering the system inoperable.

Machines have also been built using heated metallic seal jaws which close against heated metallic seal beds, as seen in Smith, U.S. Pat. No. 4,807,426. The seal is produced in paper and/or foil laminates by crimping the material between the jaws and the metallic beds. Such machines can only be used on thermoplastic shrink film with difficulty because they may destroy the film in the seal region.

SUMMARY OF THE INVENTION

The present invention eliminates many of the difficulties encountered in the prior art and takes into account the fact that the optimal temperature of the jaws for sealing a thermoplastic film is frequently quite different and somewhat lower than the optimal temperature of the jaws for cutting the film. Seal jaws heretofore have been designed to use a compromise temperature sufficiently high so that the film is softened to the point that the hot knife can cut it while the present invention is designed to concentrate on only the sealing temperature since the cut is accomplished mechanically.

The present invention consists of a hot bar jaw that has two sealing surfaces one on either side of a moveable knife blade. The seal jaw is heated to a point where good seals are made in thermoplastic film. Characteristically, this is at a considerably lower temperature than the melting point of the film and, in fact, it can be sufficiently low so that only a minimum of softening of the film is encountered. While the seal is being made, the film is trapped between the two sealing edges of the sealing bar and the edges of the slot in the elastomer surface of the sealing bed. As the sealing head continues to descend, it drives a serrated edged knife through the film between the sealing surfaces and into the slot in the elastomeric lower bed. The sealing surface serves two purposes; namely, to make a seal in the film and to clamp the film securely between the sealing surfaces and the lower bed of the sealing jaw system so that when the cutting blade is forced through the film, it cuts the film cleanly and severs one package from the other. In addition to the two spaced jaws, the invention contemplates the utilization of spring loaded film clamps outwardly of the sealing jaws to prevent premature distortion of the shrink film and to prevent the hot jaw from touching the film until the seal jaws are almost closed.

In the preferred structure, the sealing jaws have rounded noses so as to seal the film and clamp it tightly against the corners of the slot in the elastomeric lower bed. This particular corner clamping action is particularly effective in clamping the film and it is theorized that in forcing the nose of the upper seal jaw into the slot in the elastomeric lower bed, the tendency is to stretch the film more tightly across the gap so that when the cutting knife descends, the film is held in a tightly constrained condition while the cut is being made.

BRIEF DESCRIPTION OF THE DRAWINGS

FIG. 6 is a partial view similar to FIG. 5 showing a modified sealing jaw system.

DESCRIPTION OF THE PREFERRED EMBODIMENT

Figure 1:
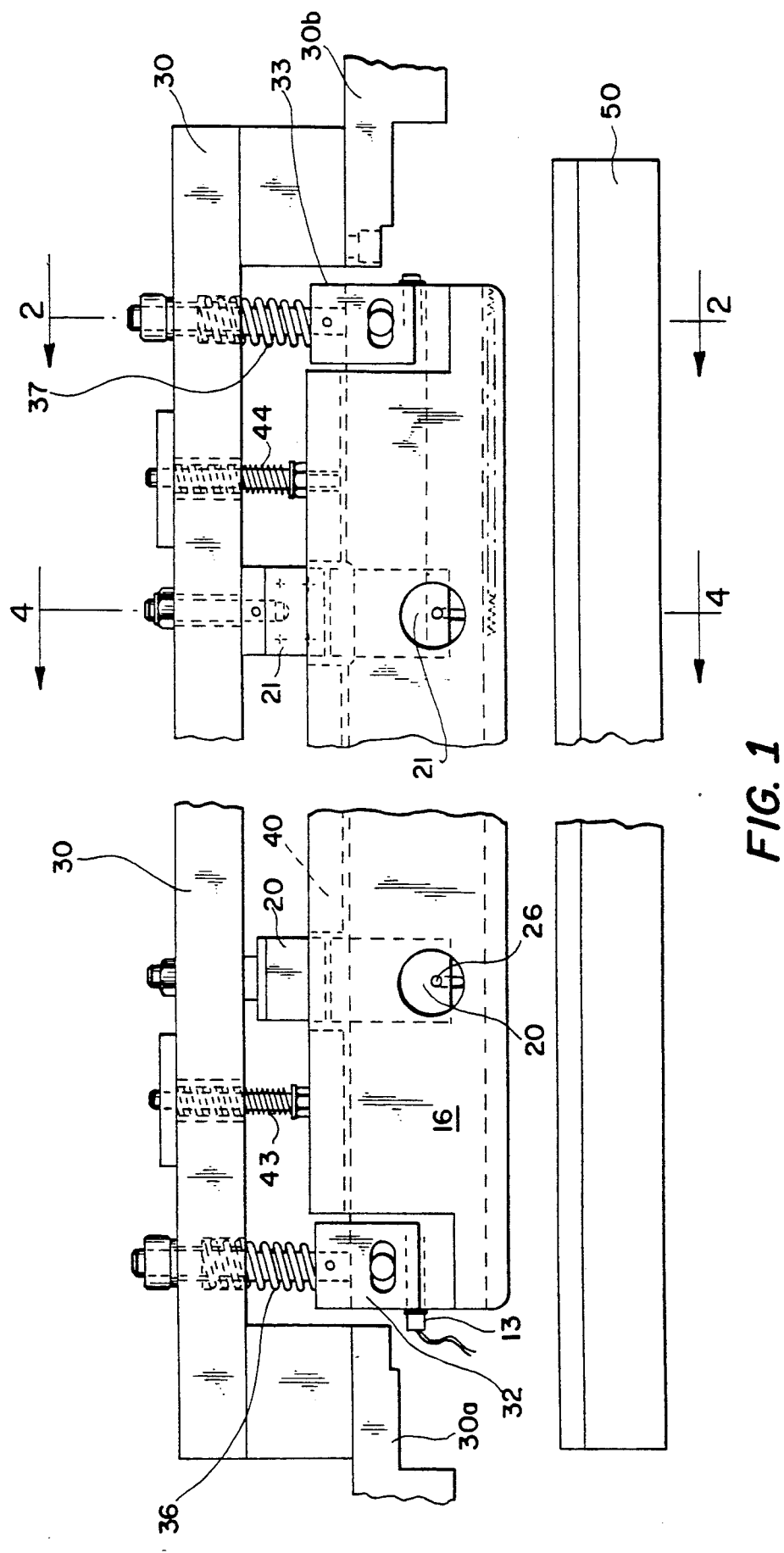
FIG. 1 is a detached front elevational view of sealing jaw system of the invention.
Figure 3:
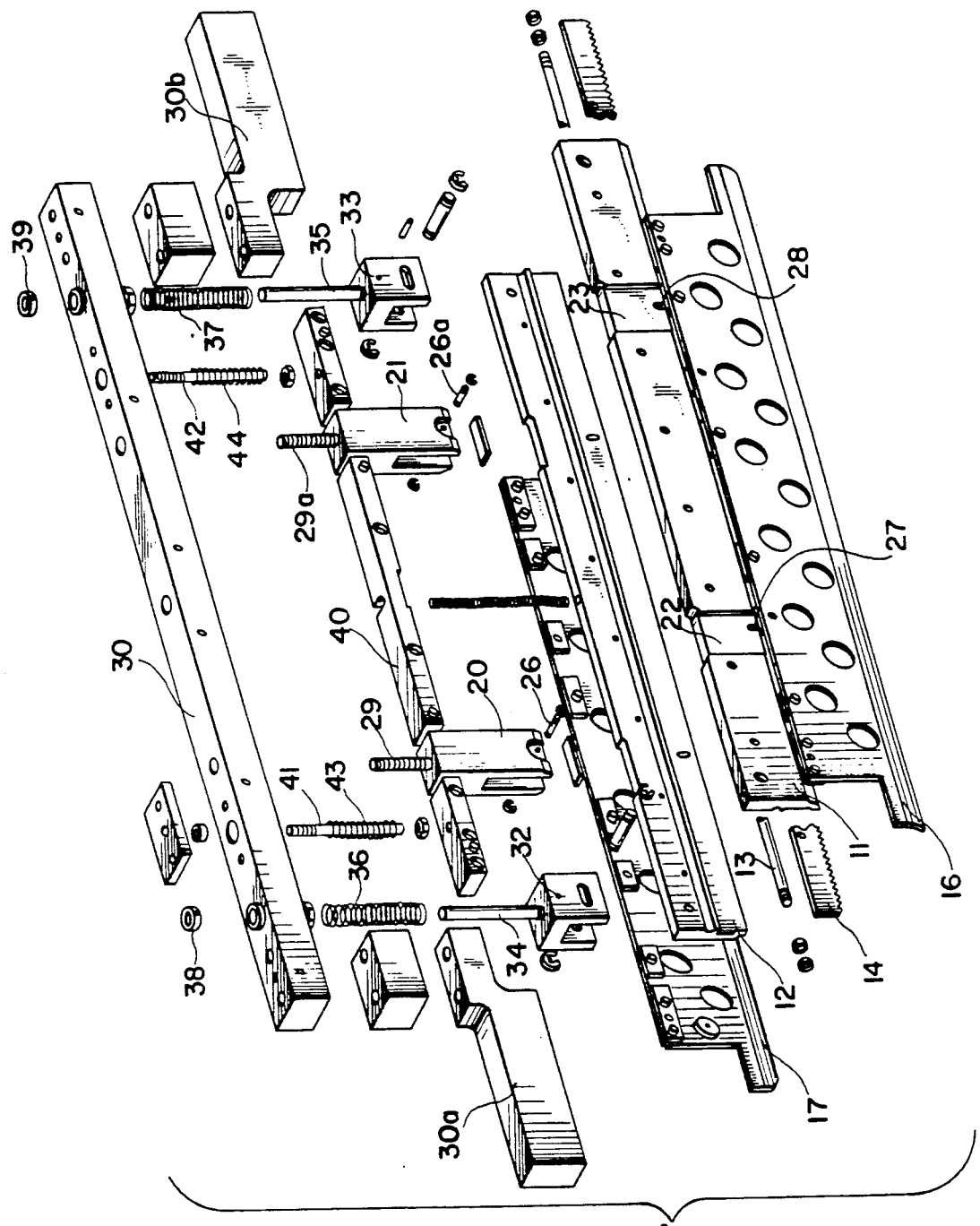
FIG. 3 is an exploded view illustrating the invention.
Figure 2:
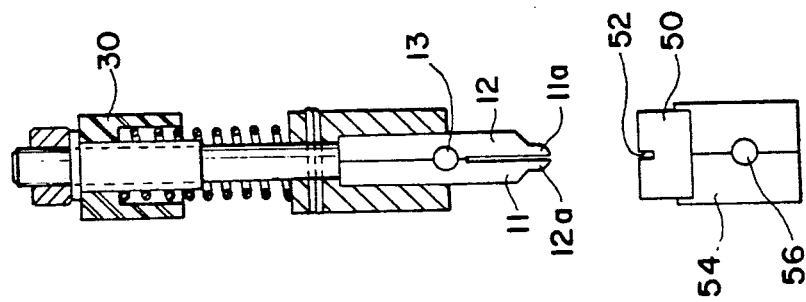
FIG. 2 is a sectional view taken on lines 2—2 of FIG. 1.

The sealing jaw assembly is illustrated for convenience as operating vertically. It should, however, be understood that the assembly may also operate horizontally. Essentially a pair of jaws 11 and 12 are formed with rounded sealing surfaces or noses 11a, 12a respectively, and are heated by an element 13. Between the two jaws is a serrated knife 14 which is retractable, as will presently appear, and surrounding the jaws 11 and 12 are film clamps 16, 17 whose purpose is to prevent the heated jaw from touching the film and/or distorting the film until the jaws have closed.

The retractable cutting blade 14 is mounted on a pair of yokes 20, 21 which yokes are received in milled-out portions such as 22, 23 of the jaw assemblies 11 and 12 and which carry pins 26, 26a that pass through elongated slots 27, 28. The yokes 20 and 21 are mounted by means of studs 29, 29a to bar 30. The sealing jaws 11 and 12, on the other hand, are mounted in another pair of yokes 32, 33 from which extend studs 34, 35, which studs are encircled by compression springs 36, 37. The studs 34, 35 are passed through the arm 30 and are restrained from a downward movement by fastening collars 38, 39. The yokes are constantly being urged downwardly by the springs 36, 37 which extend between the bar 30 and the top of the yokes 32, 33. Film clamps 16, 17 are suitably fastened onto a bar 40 and the bar 40 is resiliently suspended below arm 30 by studs 41, 42 that are encircled by compression springs 43, 44. For ease in operation of the assembly, which is essentially controlled by the bar 30, extensions such as 30a and 30b may be suitably affixed thereto as illustrated.

Mounted below the seal jaw on the wrapping machine is a transverse section of elastomeric material 50 which is formed with a central elongated slot 52 and is mounted on a bed support 54 that contains a heater 56.

Figure 5:
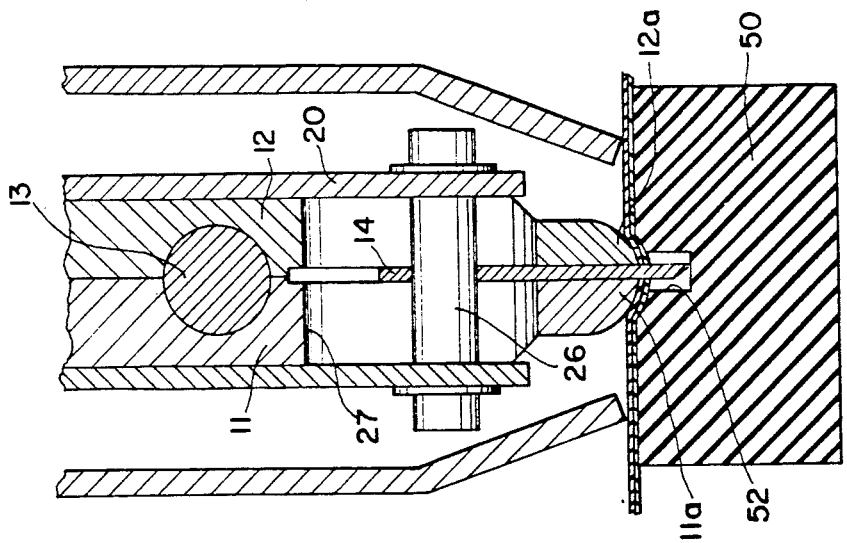
FIG. 5 is a greatly enlarged view showing the manner in which the sealing jaw system operates on the film.
Figure 4:
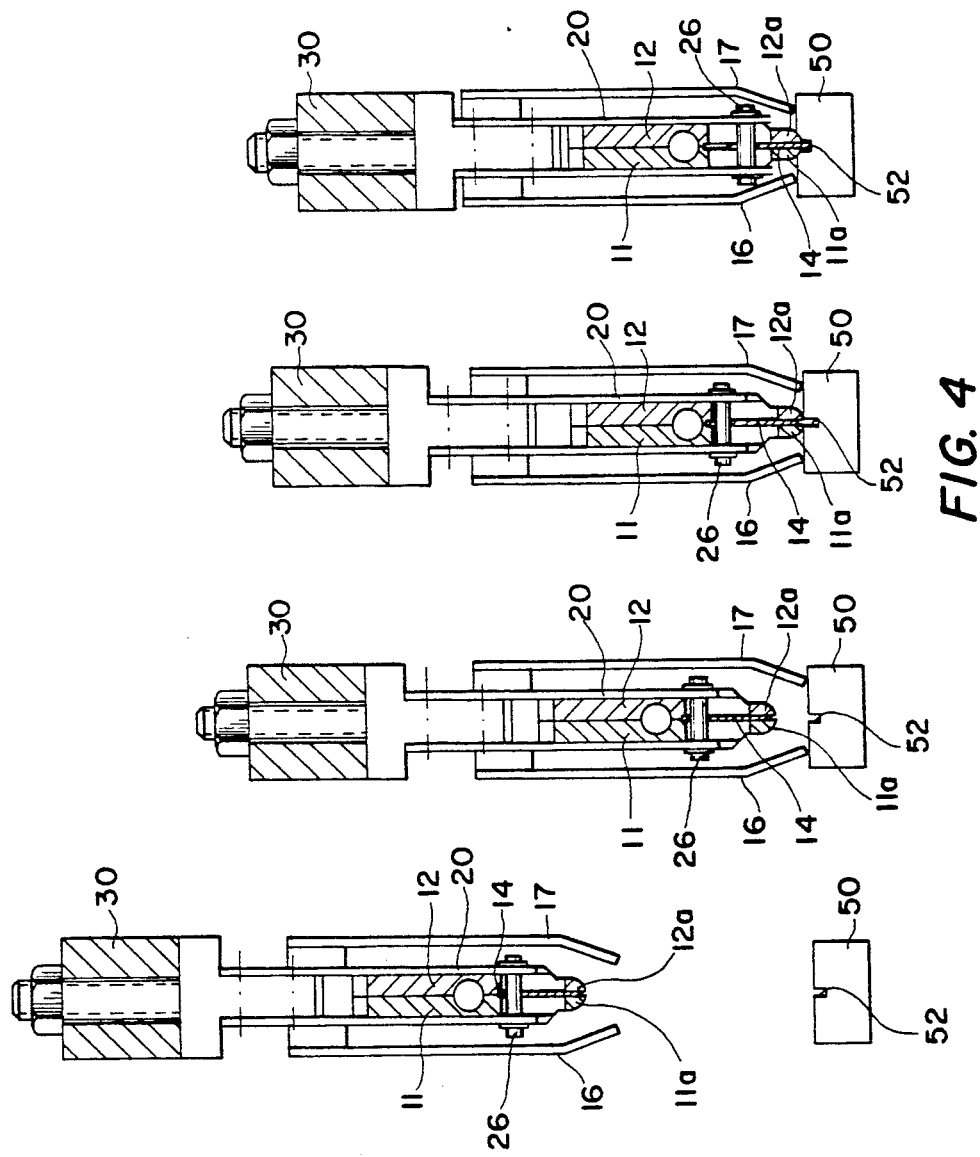
FIG. 4 is a series of diagrammatic views illustrating the operation of the sealing jaw system taken on line 4—4 of FIG. 1.

With reference now to FIGS. 4 and 5 of the drawings, it will be noted that as the operating bar 30 descends toward the elastomeric bed 50, 54, the first part to come in contact with the elastomer are the film clamps 16, 17. As the arm 30 continues to move downwardly, the film clamps 16, 17 are forced up against the pressure of compression springs 43, 44 and they retract slightly while the remaining assembly continues downwardly. As the seal jaws 11, 12 come into contact with the elastomer 50, they encounter resistance to movement as they are normally urged away from the arm 30 by springs 36, 37. Continued movement downward will compress the springs 36, 37 which are designed to provide the proper seal pressure for making good seals in the thermoplastic film.

As the arm 30 continues its downward movement, both the film clamps 16, 17 and seal jaws 11, 12 retract slightly permitting the knife blade 14, which is fixedly mounted to the arm 30 by the yokes 20, 21, to be forced out of its resting position in the slot that is located between the seal jaws 11 and 12 as seen in FIGS. 4 and 5. As the knife blade extends further out, it extends into the slot 52 in the elastomeric bed 50 forcing its way through the film which is securely clamped between the seal jaws 11 and 12 and the elastomeric bed 50. Because of the particular structure of the sealing system, the cutting knife 14 is heated by the sealing bars 11 and 12 to essentially the same temperature as the sealing bars 11 and 12 so that in the process of cutting the film, there is an opportunity also to seal the ends of the film together.

Because the cut is made mechanically in the present invention, rather than by softening the film, the cut can be made at a temperature that is appreciably lower than that which is required for severing with one of the prior art systems. Typically, when used with heated mating beds, the jaw sealing and severing system of the present invention can operate with sealing jaw temperatures of 270° F. to 280° F. on a polyethylene film that would require temperatures of 300° F. to 350° F. to operate with prior art jaw systems. Since polyethylene becomes quite molten in the 300° F. to 350° F. range, it can be readily seen that gumming and build-up can occur with the prior art jaws, whereas it does not occur with the present invention jaws. Similarly, PVC film is sealed at temperatures well below the carbonizing temperatures of the film, so that black, carbonized build-up does not occur on either the seal blade or the knife. The present invention has also been shown to be effective in sealing most of the copolymer polyolefin shrink wrapping films, producing a neat, small, uniform fin seal after the package has passed through a shrink tunnel. An additional advantage to this lower sealing temperature is that it permits the sealing operation to be equally sucessful at both higher and lower speeds using the same temperature settings. This simplifies the gradual start up of some types of wrapping machinery.

As indicated previously, it is desirable to have a heating element 56 in the bed support 54 and both of the heaters 13 and 56 will be controlled with any suitable temperature controllers. The basic reason behind heating the lower bed is that the film is a thermal insulator even when it is very thin and it would require a higher temperature in the upper sealing jaws to obtain a seal if the lower bed were left at room temperature. This becomes especially important when the operating speed of the packaging machinery in which this system is incorporated is increased, and consequently the time available to seal and cut the film decreases. By heating the lower bed, heat is driven into the film from both above and below and there is less chilling effect on the upper sealing jaw permitting a faster seal and reducing the temperature required in the upper seal bar 11 and 12. Normally, the lower bed is heated to a temperature between 150° F. and 200° F. and the elastomeric portion 50 is preferably of a durometer between 25 and 40.

FIG. 6 shows an alternate sealing jaw in which sealing surfaces 11' and 12', contact the elastomeric bed 50 in a position removed from the edges of slot 52. This embodiment has been found to be desirable where an extra wide fin seal is needed to ensure the integrity of the seal, such as in a liquid proof or light proof seal. It is also desirable where an extra strong seal is required, such as encountered when wrapping multiple products in a single sleeve of heavy gauge polyethylene.

In the preferred embodiment as shown in FIG. 5, the nose configuration of the sealing jaws as seen at 11a and 12a, closes against the corners of the slot 52 in the elastomeric seal bed, thereby keeping the film taught across the slot 52 so that it can be easily cut by the knife 14. This closing alignment also produces a gradient of sealing pressure across the width of the seal in which the higher pressure is near the cut, graduating to lower pressure near the product wrapped in the packages. This is advantageous in many applications, particularly those involving thin gauge film, because there is less chance of the hot seal jaws weakening the film adjacent to the seal. Additionally, this configuration produces a neat trim (or narrow) fin seal without the risk of putting too much pressure on the softened film in the seal area. This narrow fin shrinks even smaller during passage of the package through a shrink tunnel resulting in an attractive package to market.

We claim:

1. The method of sealing and securing finite width plastic film layers comprising the steps of providing an elastomeric bed with a central slot defining a pair of slot edges across the width of the film; engaging the film continuously across its width against said elastomeric bed on two spaced transverse lines by a first pair of clamps; moving spaced heated jaws so as to engage the edges of the central slot to fuse the film layers said jaws engaging said edges of said slot to keep the film taught and develop a pressure gradient in the film across the slot edges; providing a serrated knife; and then mechanically severing the film across its width between the jaws with said serrated knife and thereafter retracting the knife, jaws and clamps.

2. The method of claim 1 including the step of heating the elastomeric bed.

3. A sealing jaw apparatus for a film wrapping machine which wraps product in a continuous web of thermoplastic film comprising:

an elastomeric bed having an elongated slot therein defining a pair of slot edges;

an assembly including film clamps, a pair of sealing jaws having noses and a knife;

a mounting bar for the clamps, jaws and knife, said knife being directly connected to said bar, said jaws and clamps being resiliently urged away from the mounting bar;

said clamps and jaw noses moveable in and out of engagement with the bed;

said jaws being heated and spaced apart to provide a slot therebetween;

said knife mounted for reciprocation between the jaws and normally disposed in a position recessed from the noses and means urging the knife into a position below the nose of the jaws and into said elongated slot;

said film clamps being located on both sides of the jaws to prevent said film from touching the sealing jaws until said jaws engage the bed whereby the jaws when engaged against the slot edges create a pressure gradient in film across the elongated slot;

4. A sealing jaw apparatus as in claim 3 wherein the lower edges of said clamps normally extend beyond the noses of the jaws and means are provided for continuous movement of the bar toward the bed whereby first the clamps engage the film against the bed and then the noses of sealing jaws engage the film while the knife extends below the jaws.

5. A sealing jaw apparatus as in claim 3 wherein the jaws are rigid and have curved nose ends and the nose ends are aligned with the edges of the elongated slot.

6. A sealing jaw apparatus as in claim 3 wherein the knife has a serrated lower edge to facilitate cutting film.

7. An apparatus as in claim 3 wherein the elastomeric bed has heating means disposed therein.

* * * * *